June 12, 1956 — M. H. KOWAL — 2,750,082

MEASURING AND DISPENSING CARTON

Filed Sept. 24, 1951 — 4 Sheets-Sheet 1

INVENTOR.
MICHAEL H. KOWAL
BY Ostrolenk & Faber
ATTORNEYS

June 12, 1956  M. H. KOWAL  2,750,082
MEASURING AND DISPENSING CARTON
Filed Sept. 24, 1951  4 Sheets-Sheet 2
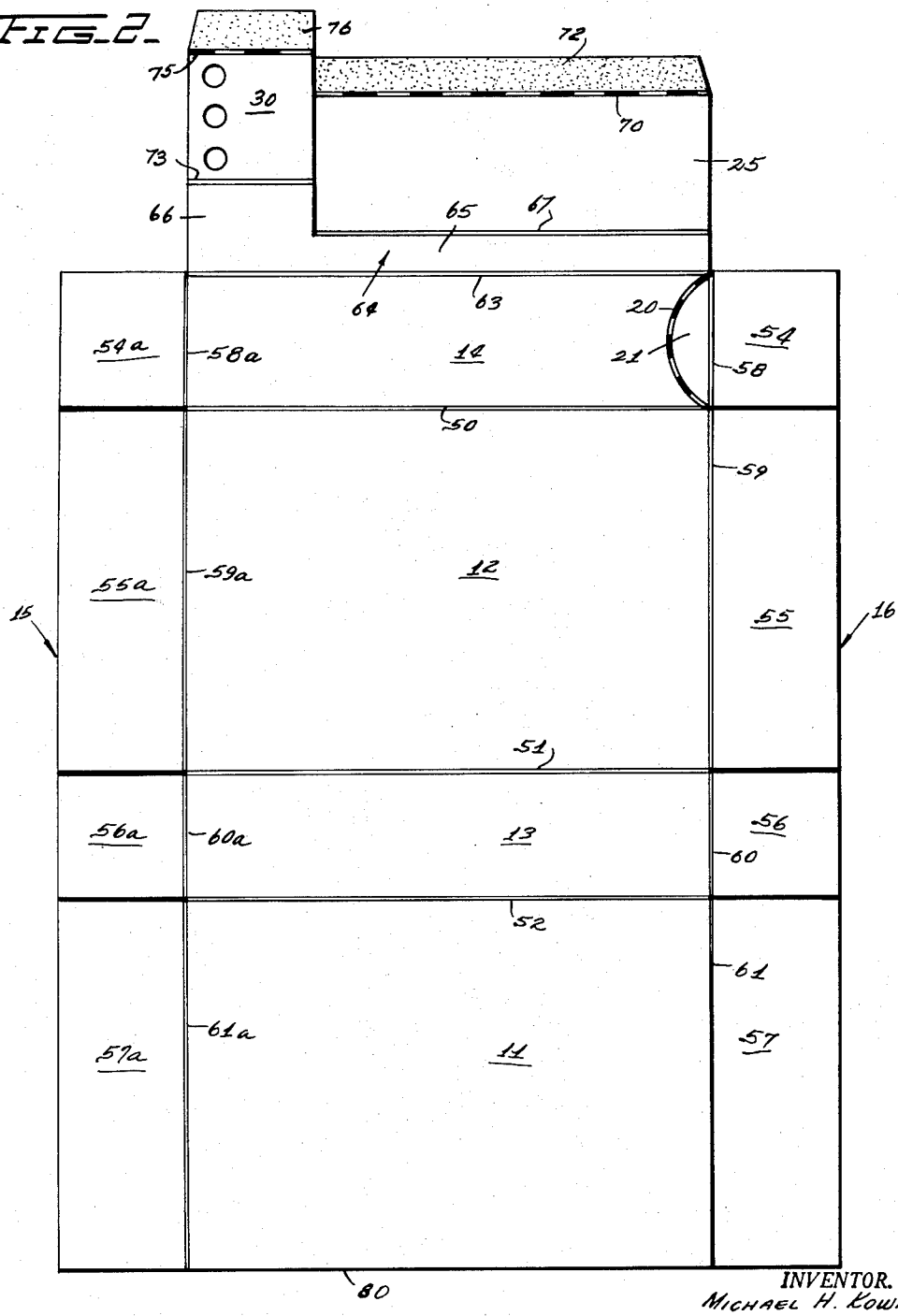
INVENTOR.
MICHAEL H. KOWAL
BY
Ostrolenk & Faber
ATTORNEYS June 12, 1956 M. H. KOWAL 2,750,082
MEASURING AND DISPENSING CARTON
Filed Sept. 24, 1951 4 Sheets-Sheet 3

INVENTOR.
MICHAEL H. KOWAL
BY
Ostrolenk & Faber
ATTORNEYS

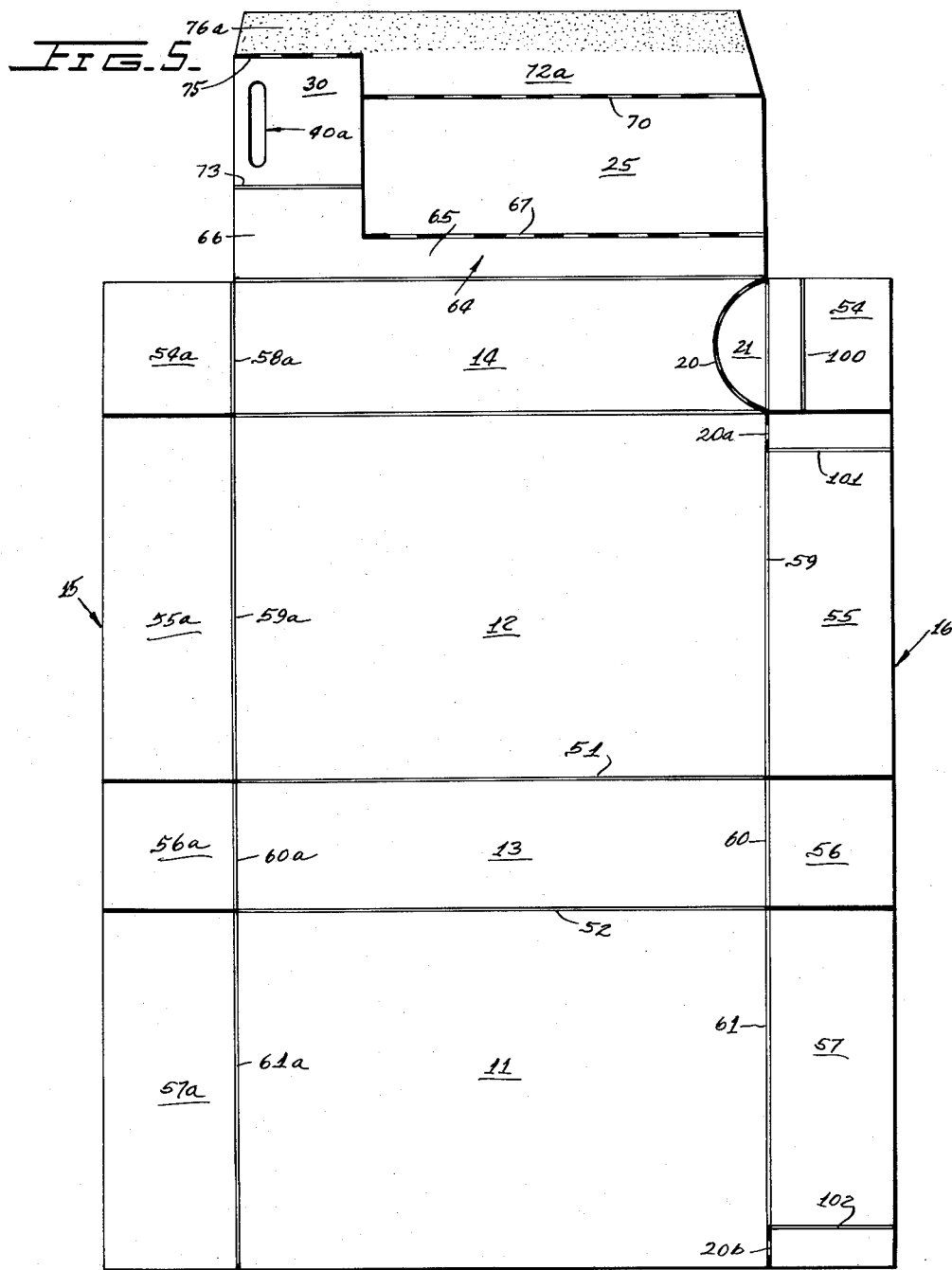

United States Patent Office 2,750,082
Patented June 12, 1956

2,750,082
MEASURING AND DISPENSING CARTON

Michael H. Kowal, Clifton, N. J., assignor to Empire Box Corporation, Garfield, N. J., a corporation Application September 24, 1951, Serial No. 247,944

3 Claims. (Cl. 222—455)

My invention relates to folding cartons made from a one piece blank, and more particularly to a carton so arranged that after an appropriate opening is made adjacent the top thereof then, on each inversion of the carton a predetermined measured quantity of the material contained in the carton will be delivered through the opening.

In the packaging of powdered soaps and detergents, particularly of the type intended to be used in modern automatic home washing machines, and in the packaging of other flowable materials for home use it has become important to the home user that simplified means be provided for predetermining the exact quantity of the flowable material when it is poured from the box or carton. Particularly in the case of certain types of soaps and most detergents the delivery of an exactly predetermined quantity of material becomes of real importance owing to the fact that an increased quantity only slightly greater than the desired quantity will produce an unnecessarily large and, in many cases, extreme quantity of suds, tending to overflow on the floor adjacent the machine and tending, also, to foul the machine.

A quantity of material which is only slightly less than the required amount may fail to produce sufficient suds or a sufficiently concentrated solution to achieve the desired cleansing effect.

Consequently many devices have been offered to enable the home user to measure desired quantities accurately and the average home user in fact has, for the most part, adopted the system of utilizing a small jar or glass into which the appropriate quantity is measured before it is used.

Many attempts have been made to obviate the need for additional measuring devices by arranging the package to deliver predetermined quantities of material. These attempts have failed commercially owing to: (1) to complex structures which have been used for this purpose; (2) to arrangements of partitions and baffles in the box in such manner that the cost of manufacture of the box has been substantially increased either: (a) by increasing the size of the blank excessively, thereby resulting in a great waste of the paper material use in the box beyond commercial sales value, or (b) by arranging the baffles and partitions in such manner that the box could not be made in the simplified automatic high speed manner necessary for the manufacture of such boxes or cartons in an economic way and so that standard machines adapted to the making of folding boxes or cartons could not be used.

The box or carton must be so arranged that:

1. It may be made from a single blank.
2. It may be made on automatic existing machines adapted to the manufacture of folding boxes or cartons.
3. It may be set up and one end closed prior to filling by existing automatic machines which are adapted to set up and close the bottoms of existing cartons.
4. It may thereafter be filled by existing machines adapted to fill the box.
5. It may thereafter be closed by existing automatic machines adapted to close the box or carton.

In addition to these factors which have not been met by prior attempts to solve the problem, a particular relationship is required between various elements of the baffle and chute which is used in the measuring and dispensing carton so that only the predetermined quantity of material will be dispensed.

In prior attempts to produce a carton of this type which have failed commercially this particular relationship was neither understood nor followed.

My invention contemplates providing a vertical partition or baffle at a lower corner of the carton with a baffle preferably parallel to one of the narrow walls of the box or carton and defining, with the bottom wall of the carton and the side narrow wall of the carton, a predetermined volume which will be the volume of material which it is desired to dispense with any one tilt of the carton.

A chute is then provided by an additional partition spaced inwardly further toward the narrow wall than the baffle and created by an additional partition which extends vertically to the top of the carton and has a lower edge at the horizontal level of the top of the baffled partition. Appropriate means is then provided at the upper end of the carton preferably, although not necessarily, in the narrow wall to create an opening at said upper end communicating with the chute through which the material to be dispensed may then pour.

When the box or carton is stood on its bottom end the head of material in the box or carton fills the volume defined by the baffled partition; but, although the material is flowable it has sufficient friction between particles and is sufficiently light that the material is not forced from the bottom up into the chute. Since the chute partition extends to the top of the box the material in the box or carton cannot enter the chute laterally, but can only enter from the section beneath the chute defined by the baffle.

When the box is then tilted and inverted on the side toward the chute all of the material in the box falls towards the top. The material which is contained in the section defined by the baffled partition flows down the chute and out through the opening, while the other material in the box falls against the top closure.

When the box is replaced again, it is turned again with the bottom wall down. All the material falls to the bottom and fills the section defined by the baffle once more, so that when the box is tilted again and inverted, then once more a predetermined volume flows out down the chute.

By this means, therefore, a predetermined volume of material will be dispensed on each inversion of the box or carton until the level of the material in the box falls below the top level of the baffled partition.

Thereafter, tilting the box slightly toward the narrow wall adjacent which the chute and baffled partitions are located and shaking the box will cause the baffle to be filled prior to inversion of the box. In addition, and to permit the filling of the baffle when small quantities of the material are left in the box, I provide one or more small openings adjacent the bottom of the baffled partition; when the level of material in the box drops below the top level of the baffled partition, shaking of the box will cause the material to sift through into baffled section and fill the baffled section prior to tilting the box.

By this means, therefore, even the final portions of the contents of the box may be dispensed in measured quantities.

The primary object of my invention, therefore, is the provision of a novel dispensing carton or box having a baffled partition and a chute partition so arranged that the box may be made on standard box making machines and set up, closed and filled on standard machines utilized for this purpose for ordinary boxes, cartons or filling containers.

Another object of my invention is the provision of a novel partitioned box or carton which may be made from a single blank.

Another object of my invention is the arrangement of the baffled partition and the chute partition so that the bottom end of the chute partition is at the same level as the top end of the baffled partition.

Another object of my invention is the formation of a novel partitioned box, carton or container having separate baffled and chute partitions, both of said partitions being extensions of a single side wall at one end of the blank.

The foregoing and many other objects of my invention will become apparent in the following description and drawings in which:

Figure 2 is a plan view of the blank for forming my novel partitioned box or carton.

Figure 5 is a view of a modified blank for my novel carton.

Figure 1:
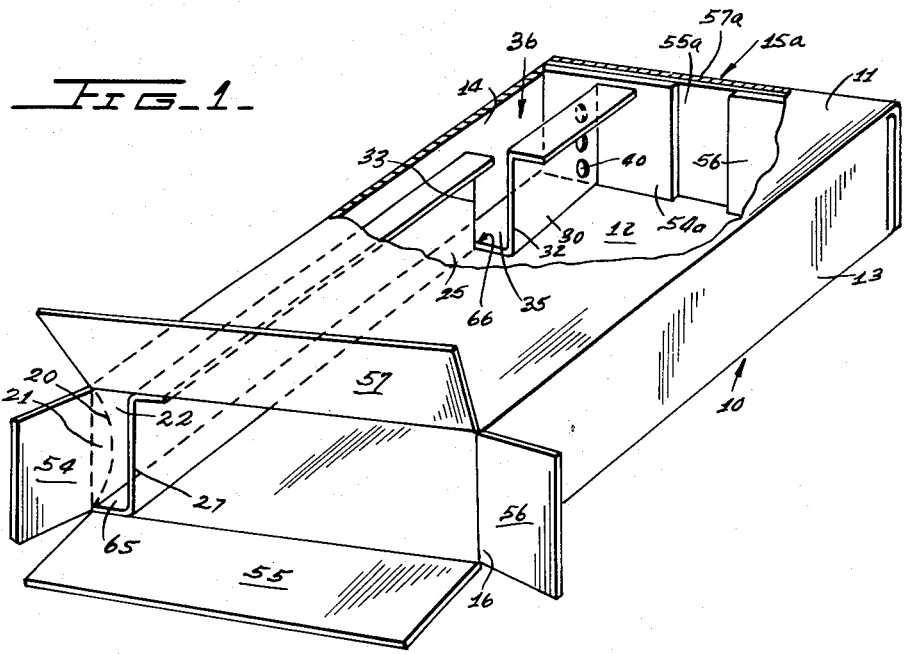
Figure 1 is a view in perspective, partly broken away, showing my novel folding box or carton in set-up form with the end flaps open at one end in order more clearly to illustrate the partition arrangement.

Referring first to Figure 1, my novel box or dispensing carton 10 is provided with the wide side walls 11 and 12, the narrow side walls 13 and 14, the bottom wall 15 and the top wall 16. The upper end of one of the narrow side walls 14 is provided with weakening line 20, in this case shown in arcuate form so that the tab 21 may be bent out by inward thumb pressure to create an opening at the upper corner of the box or carton communicating with the chute 22 hereinafter described.

Any suitable means may be utilized for forming the opening at a predetermined section of either the upper end of the side wall 14 or above top wall 16 at an area which would communicate with the interior of chute 22.

Chute 22 is formed by the partition 25 which extends between the wide walls 11 and 12 and is parallel to the lateral side wall 14. The partition 25 is so arranged that its top edge 27 engages the top wall 16 when the carton is closed so that the material cannot exit from the top of the chute except through the opening created by the bending in of flap 21.

Figure 6:
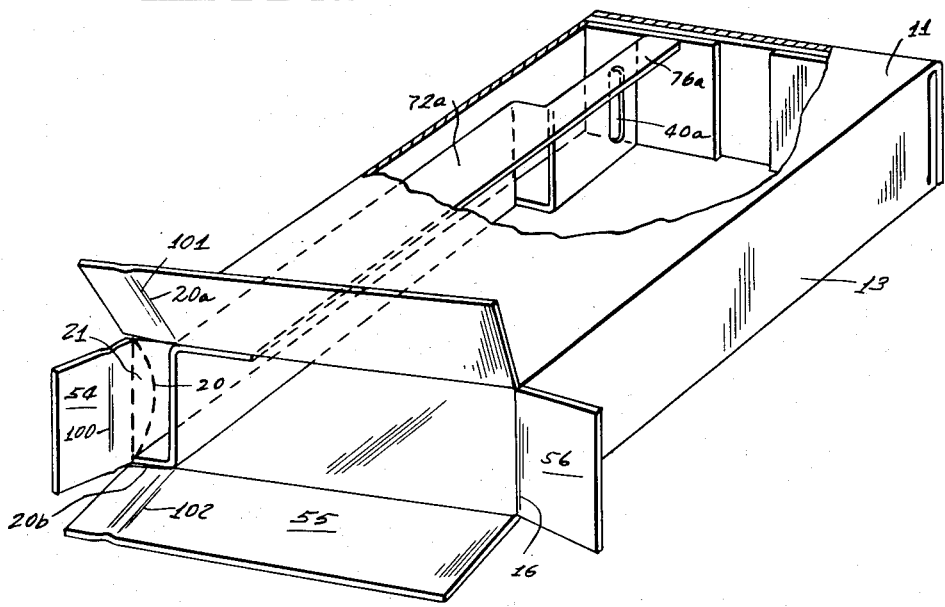
Figure 6 is a view in perspective showing the use of the modified blank.

An additional baffled partition 30 is provided between the opposite walls 11 and 12 parallel to the narrow side wall 14 and spaced further from the narrow side wall 14 than the partition 25. This may be modified as shown in Figures 5 and 6. The top edge of baffle 32 is preferably at the same level as the bottom edge 33 of partition 25, thereby providing an opening 35 from the interior of the measuring section 36.

The exact formation of the carton and the manner in which top and bottom walls 15 and 16 are formed will be hereinafter described in connection with Figures 2 and 3.

When the carton is stood on the bottom wall 15, the contents of the carton or box naturally fall toward the bottom wall 15 and where the carton contains a quantity of material which extends up above the edge 32 of baffled partition 30 the entire volume 36 of the baffled section of the carton is filled by the material. Thereafter, when the carton is tilted from its erect position on the bottom wall 15 toward the narrow wall 14 in the natural motion to cause material to flow out through the opening created by the bend in flap 21, the material contained in the baffled section 36 will flow down the chute defined by partition 25 and out through the opening created by flap 21.

Even after the contents of the box fall below the top edge 32 of baffled partition 30, then on returning the box to erect position on its bottom wall 15, the contents slide down the inner side of panel 25 and normally refill the baffled section. If this should not occur when the contents of the box are almost depleted, shaking of the box will cause the baffled section 36 to be filled since the material in the main section of the box will have free movement so that it may readily fall into the baffled section while the material in the baffled section will not have free movement owing to the close spacing between partition 30 and wall 14.

Owing to these relative degrees of movement of material, a shaking of the box will fill the baffled section 36 even though the total quantity of material in the box as a whole does not have sufficient remaining volume to reach above the edge 32 of baffle 30.

Where desired, and in order to speed the filling of the baffled section 36 when only a small quantity of material is left, I have found placing one or more small openings 40 or slots adjacent the bottom of baffle partition 30 will permit the material to sift through on shaking of the box into baffled section 36 to fill the baffled section 36 prior to a tilting of the box.

By this means, therefore, a partitioned box is provided which permits a measured predetermined volume of material to be dispensed through the opening created by the flap 21 at the end of the chute area 22 at least until the general level of the material in the box or carton falls to below the top edge 32 of baffled partition 30. Thereafter, the carton may nevertheless dispense a predetermined volume of material as defined by baffled section 36 if the box is shaken prior to tilting and pouring of the material.

This action will continue until the total material left in the box is less than the predetermined volume or, in other words, less than one serving or pouring or predetermined measured quantity.

I have also found that forming the partitions 30 and 25 so that the top edge 32 of baffled partition 30 is at the level of bottom edge 33 of chute partition 25 not only makes the manufacture of a box a simplified matter, but also insures that only the predetermined quantity will be dispensed.

Raising the edge 32 above the edge 33 will fill the baffled area with material which falls back into the box area rather than down the chute and creates an additional chute to the interior of the box to cause variable quantities of material to be divided between the exit chute and the interior of the box. Lowering the edge 32 of baffled partition 30 below the edge 33 of chute partition 25 makes it possible on tilting of the box for additional material in the box itself and not in the baffled section 36 to flow down the exit chute 22, thereby destroying the predetermined measure which had been created.

My novel box or carton, as previously pointed out, has been arranged so that it may readily be manufactured from a single blank and automatic box making and folding machines and thereafter may be erected, filled and closed by automatic existing machines adapted to be used for this purpose.

In Figure 2, the blank is shown cut and scored to form the various elements of the carton.

Wall section 14 is hingedly connected to wall 12 by score line 50. Wall 12 is connected by score line 51 to wall 13 and wall 13 is connected by score line 52 to wall 11. Each of the walls 14, 12, 13 and 11 has a pair of flaps at the opposite or top and bottom ends thereof, flaps 54, 55, 56 and 57 being connected respectively to walls 14, 12, 13 and 11 by the respective fold lines 58, 59, 60 and 61. When the box is finally formed and closed flaps 54, 55, 56 and 57, as shown in Figure 1, form the top wall of the carton. Likewise, flaps 54a, 55a, 56a and 57a are connected respectively to the walls 14, 12, 13 and 11 by the respective score lines 58a, 59a, 60a and 61a.

These flaps are folded and sealed to form the bottom of the carton.

While the top of the carton is shown open in Figure 1, it is customary in the filling of cartons first to erect the cartons and second to seal the top end, which comprises flaps 54, 55, 56 and 57, leaving the bottom end open, then to fill the carton and then to close the bottom end. Of course, the carton may be filled from either end.

Wall 14 is hingedly connected by the score line 63 to the L-shaped flap 64, which is actually the glue flap, as hereinafter described, utilized to provide a place for the placement of adhesive in order to form the carton blank into a collapsed, complete tube. The L-shaped glue flap 64 has the flap section 65 and the wider flap section 66. Flap section 65 is hingedly connected by the fold line 67 to the chute partition flap 25. Chute partition flap 25 is hingedly connected by fold line 70 to the glue flap 72.

Section 66 of the glue flap 64 is hingedly connected by fold line 73 to the baffle flap 30, which in turn is connected by fold line 75 to the glue flap 76.

Figure 3:
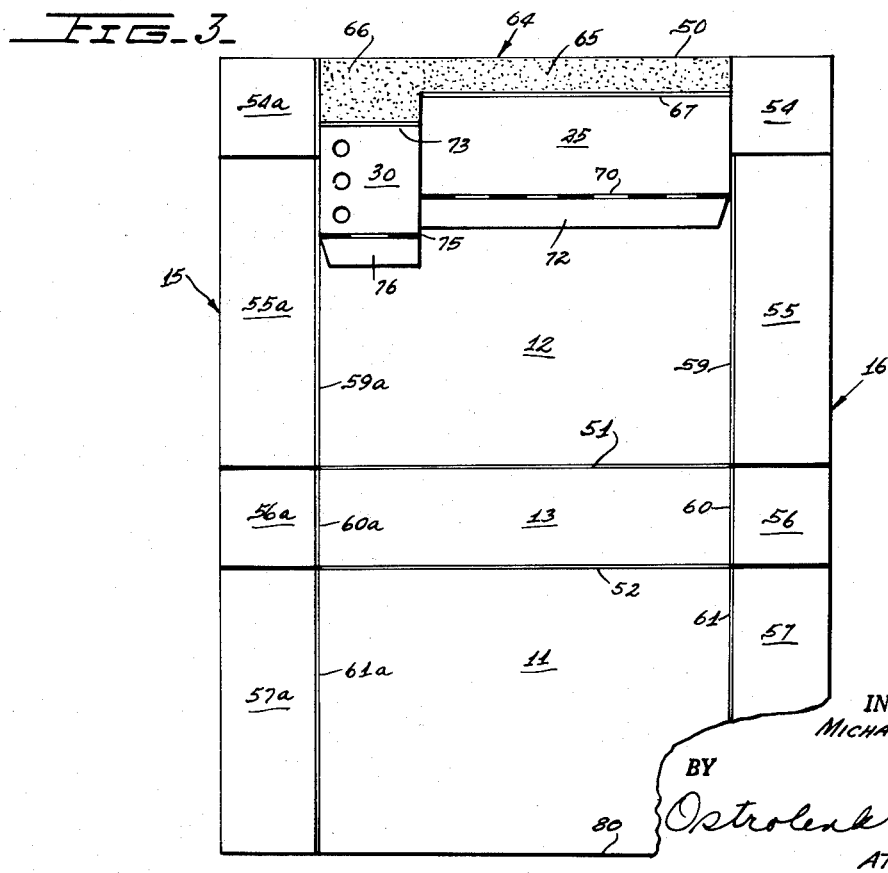
Figure 3 is a plan view of the blank of Figure 2 after the first fold has been made therein in the manufacturing operation.

The first operation in forming the carton from the blank of Figure 2 is to fold the entire assembly comprising glue flap 64 and the associated flaps 25 and 30 around the fold line 63 from the position of Figure 2 to the position of Figure 3. Prior to fold, however, glue is applied to the flap 72 and flap 76, as indicated in Figure 2, so that when the fold occurs flaps 72 and 76 are adhesively secured to the inside of wall 12, as shown in Figures 3 and 1. Flaps 72 and 76 may be continuous as shown in Figures 5 and 6.

Glue is applied also to the surface of flap 64 just prior to the application of glue to flaps 72 and 76.

After the fold has occurred, as seen in Figure 3, the carton is folded about the fold line 51 bringing the outer edge 80 of wall 11 up to the fold line 50 where the flap 64 is adhesively secured to the inside of the margin of wall 11 at edge 80. The carton is now completed at the manufacturing plant.

Figure 4:
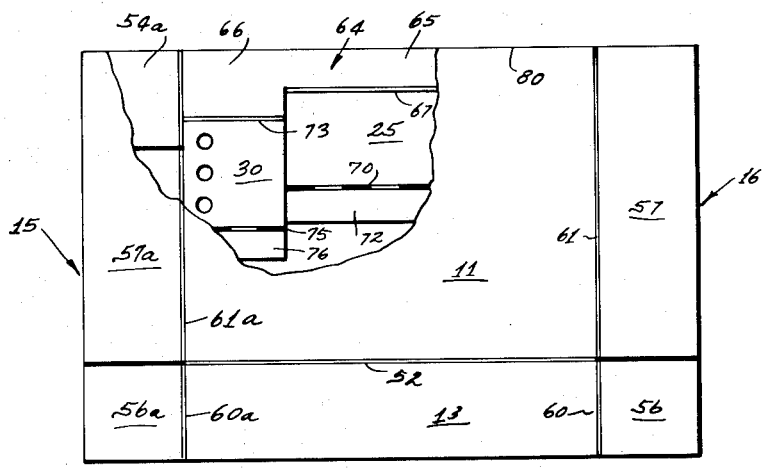
Figure 4 is a plan view of the blank in final glued condition.

When, thereafter, the carton is expanded the opening of the carton from the collapsed form of Figure 4 to the tubular form of Figure 1, owing to the arrangement of flaps 64 (and its elements 65 and 66), 72 and 76, and the areas to which they are secured, the chute 22 defined by partition 35 and the measuring section 36 defined by baffled partition 30 are formed automatically without any further operation. One end of the carton is closed and sealed by pressing down and gluing the flaps 54, 55, 56 and 57, or 54a, 55a, 56a and 57a at that end, and the carton is filled through the remaining open end. Then the open end is sealed by closing down and adhesively securing the flaps at said open end, and the carton is ready for shipment.

When the carton is placed into use, the user presses his thumb against the tab 21 of wall 14, tearing it open along the weakening line 20 to create the opening at the end of the chute 22, and the carton may thereafter be used in the manner previously described.

In Figures 5 and 6 I have shown a preferred form of my carton which embodies the principle of the carton of Figures 1 and 2 but wherein the glue flap 72a is continuous with flap 76a the baffle 30a being cut in part from wall 25 as in Figures 1 and 2 and in part from panel 76a. This facilitates formation of the carton. Also, the opening 40a is here shown as a single slot, which may be preferable rather than as a series of holes.

Also, the weakening line 20 of tab 12 is continued at 20a and 20b at the sides of the box to fold lines 100, 101, 102 which limit the tear back so that it does not extend beyond the chute while the chute is nevertheless opened at the top.

By this means, therefore, a measuring or dispensing carton is provided which may be made from a single one-piece blank requiring only a slight increase in one dimension of the blank over a non-dispensing carton (as against other types of dispensing cartons requiring a substantial multiplication of the blank area used); the carton may be made on ordinary machines usually utilized for the manufacture of ordinary cartons and may thereafter be expanded, filled and closed by the ordinary machines usually utilized for ordinary non-dispensing cartons.

Thus, the carton of my invention may be made with no increase in the cost of manufacture, or the time or man hours consumed in the manufacture thereof. The only additional paper needed for the making of a carton is only that needed actually to form the two partitions and the small securement flap or flaps for each of them, without the expenditure or waste of any other paper and without the expenditure or waste which arises when an irregular blank having many extensions beyond the rectilinear area of the main blank must be used.

In use, the carton provides an automatic measure for predetermined quantities of material, dispensing these quantities accurately until the level of material in the carton has dropped to below the top edge 32 of baffle 30.

Thereafter, the measuring function may be continued by shaking the box prior to each inversion and pouring of the contents.

Consequently, an appropriate legend may be placed on the box instructing the user to shake before pouring when the contents are almost depleted.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A blank for a dispensing carton comprising a plurality of wall panels hingedly joined, one such panel 14 being provided with a glue panel 65—66 hingedly connected thereto at a foldable edge 63, which edge forms a corner of said carton when said carton is erected, a pair of baffle panels 25 and 30 each connected hingedly to said glue panel along staggered, parallel fold lines 67 and 33 so that said baffle panels are spaced from each other and in substantial parallelism when said carton is erected, said baffle panels being severed from each other and connected only to said last-mentioned glue panel when said carton is in non-erected condition, each of said baffle panels having respective glue flaps 72 and 76 foldably joined thereto, and engageable with a carton wall panel 11 adjacent said one panel 14 when said carton is erected.

2. A blank as set forth in claim 1, wherein said baffle panels are of unequal length, one panel being substantially shorter than the other.

3. A blank as set forth in claim 1, one such panel being provided with perforations.

References Cited in the file of this patent

UNITED STATES PATENTS

| | | |
|---|---|---|
| 2,023,537 | Myers | Dec. 10, 1935 |
| 2,393,262 | Percy | Jan. 22, 1946 |